United States Patent
Visenzi

(10) Patent No.: US 11,891,147 B2
(45) Date of Patent: Feb. 6, 2024

(54) MOTORCYCLE BAG SUPPORTING AND TILTING KIT

(71) Applicant: GIVI S.P.A., Flero (IT)

(72) Inventor: Giuseppe Visenzi, Brescia (IT)

(73) Assignee: GIVI S.P.A., Flero (IT)

( * ) Notice: Subject to any disclaimer, the term of this patent is extended or adjusted under 35 U.S.C. 154(b) by 277 days.

(21) Appl. No.: 17/605,858

(22) PCT Filed: Jun. 3, 2020

(86) PCT No.: PCT/IB2020/055219
§ 371 (c)(1),
(2) Date: Oct. 22, 2021

(87) PCT Pub. No.: WO2020/245732
PCT Pub. Date: Dec. 10, 2020

(65) Prior Publication Data
US 2022/0204105 A1    Jun. 30, 2022

(30) Foreign Application Priority Data

Jun. 7, 2019 (IT) .................. 102019000008382

(51) Int. Cl.
*B62J 9/24* (2020.01)
*B62J 9/23* (2020.01)
*B62J 9/27* (2020.01)

(52) U.S. Cl.
CPC . *B62J 9/24* (2020.02); *B62J 9/23* (2020.02); *B62J 9/27* (2020.02)

(58) Field of Classification Search
CPC .................. B62J 9/23; B62J 7/08; B62J 9/27; B62J 7/04
See application file for complete search history.

(56) References Cited

U.S. PATENT DOCUMENTS 3,795,354 A * 3/1974 Stippich ............ B62J 7/08
224/430
4,480,773 A * 11/1984 Krauser ............ B62J 7/00
224/430

(Continued)

FOREIGN PATENT DOCUMENTS

CN    102803057 A    11/2012
CN    104602998 A    5/2015

(Continued)

OTHER PUBLICATIONS

Combined Chinese Office Action and Search Report dated Jul. 18, 2022 in Chinese Patent Application No. 202080036379.5 (with English translation of Category of Cited Documents), 7 pages.

(Continued)

*Primary Examiner* — Brian D Nash
(74) *Attorney, Agent, or Firm* — Oblon, McClelland, Maier & Neustadt, L.L.P.

(57) ABSTRACT

A supporting and tilting kit for at least a bag of a motorcycle including a supporting frame adapted to be associated to a frame of said motorcycle, the supporting frame includes at least two tubular elements, a first tubular element and a second tubular element, supporting device mounted with said supporting frame and adapted to be separably engaged with said at least one bag, at least one tilting device including a supporting base mounted with said at least one bag and at least a hooked element having at least one spacer arm having a first end pivoted with said supporting base and a second end which includes a hook portion adapted to hook said first tubular element, said at least a hooked element being adapted to rotate pivoted from a disengaged position to a coupling position.

17 Claims, 14 Drawing Sheets

(56) References Cited

U.S. PATENT DOCUMENTS

| | | | | |
|---|---|---|---|---|
| 4,580,706 | A * | 4/1986 | Jackson | B62J 9/23 224/438 |
| 5,558,260 | A * | 9/1996 | Reichert | B62J 7/04 224/415 |
| 5,762,249 | A * | 6/1998 | Hann | B62J 9/27 224/430 |
| 6,053,384 | A * | 4/2000 | Bachman | B62J 9/27 224/430 |
| 7,175,220 | B2 * | 2/2007 | Kashiwagi | B62J 11/00 280/288.4 |
| 7,654,496 | B2 * | 2/2010 | Sharpe | B62J 1/28 280/288.4 |
| 8,888,059 | B2 * | 11/2014 | Kohberg | B60R 11/00 248/397 |
| 10,065,698 | B1 * | 9/2018 | Sliwa | A45C 13/385 |
| 10,378,247 | B2 * | 8/2019 | Bunyer | E05B 35/00 |
| 2004/0232183 | A1 * | 11/2004 | Watanabe | B62J 9/26 224/431 |
| 2013/0134747 | A1 * | 5/2013 | Reinhardt | B60N 2/22 297/188.05 |
| 2014/0136076 | A1 * | 5/2014 | Novak | B62K 19/48 701/99 |
| 2014/0167387 | A1 * | 6/2014 | Komatsu | B62J 9/23 280/288 |
| 2015/0191210 | A1 | 7/2015 | Visenzi | |
| 2015/0203165 | A1 * | 7/2015 | Bunyer | B62J 7/04 224/413 |
| 2015/0367902 | A1 | 12/2015 | Schanz et al. | |
| 2017/0369115 | A1 | 12/2017 | Kokubo et al. | |
| 2018/0304950 | A1 | 10/2018 | Visenzi | |
| 2021/0094648 | A1 * | 4/2021 | Sugawara | B62K 19/46 |
| 2022/0081053 | A1 * | 3/2022 | Putnam | B62J 9/28 |

FOREIGN PATENT DOCUMENTS

| | | |
|---|---|---|
| CN | 107107981 A | 8/2017 |
| CN | 108137111 A | 6/2018 |
| EP | 3 121 097 A1 | 1/2017 |
| GB | 0 307 815 | 5/2003 |
| GB | 2 400 088 A | 10/2004 |
| JP | 11-115849 A | 4/1999 |
| JP | 2017-119504 A | 7/2017 |
| WO | WO 2017/033054 A1 | 3/2017 |
| WO | WO 2017/072720 A1 | 5/2017 |
| WO | WO 2017/153014 A1 | 9/2017 |

OTHER PUBLICATIONS

International Search Report dated Sep. 4, 2020 in PCT/IB2020/055219 filed on Jun. 3, 2020.

* cited by examiner

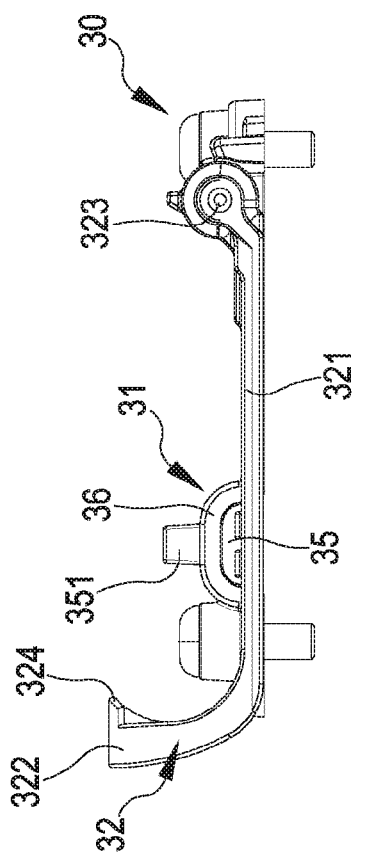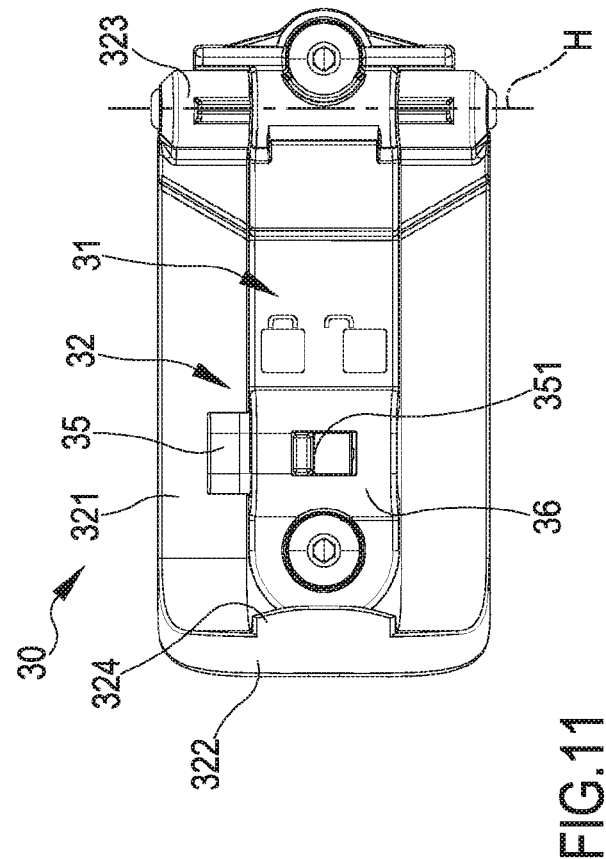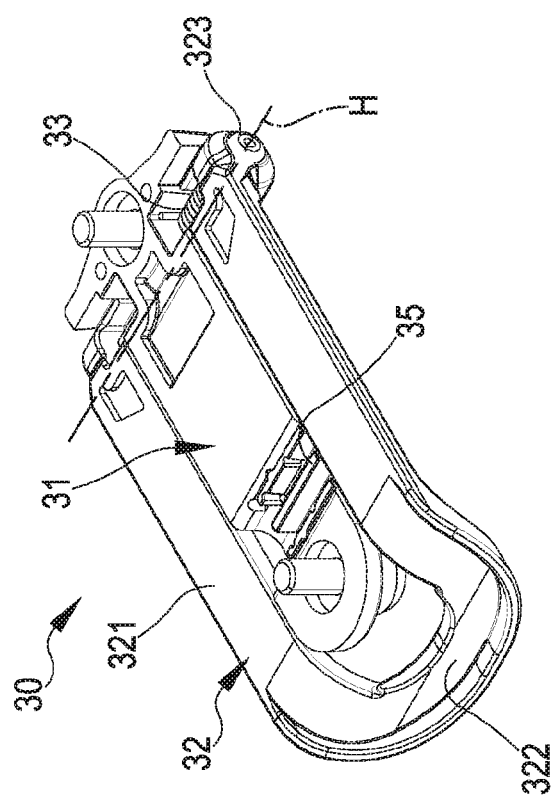

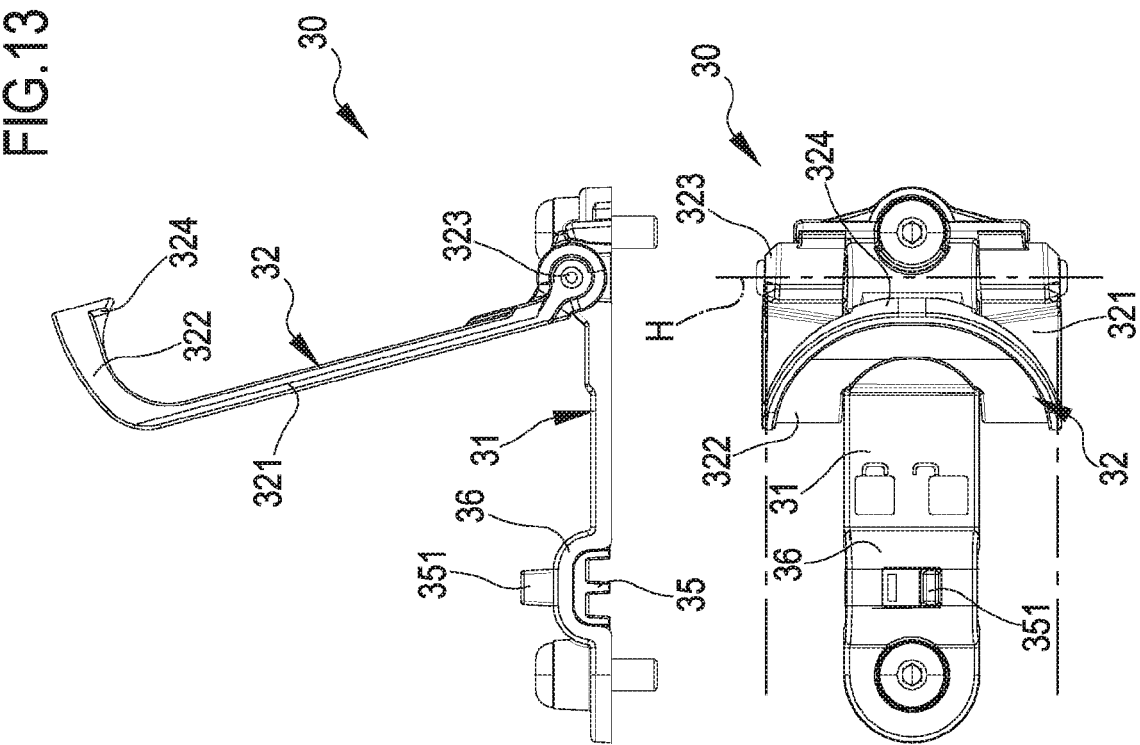
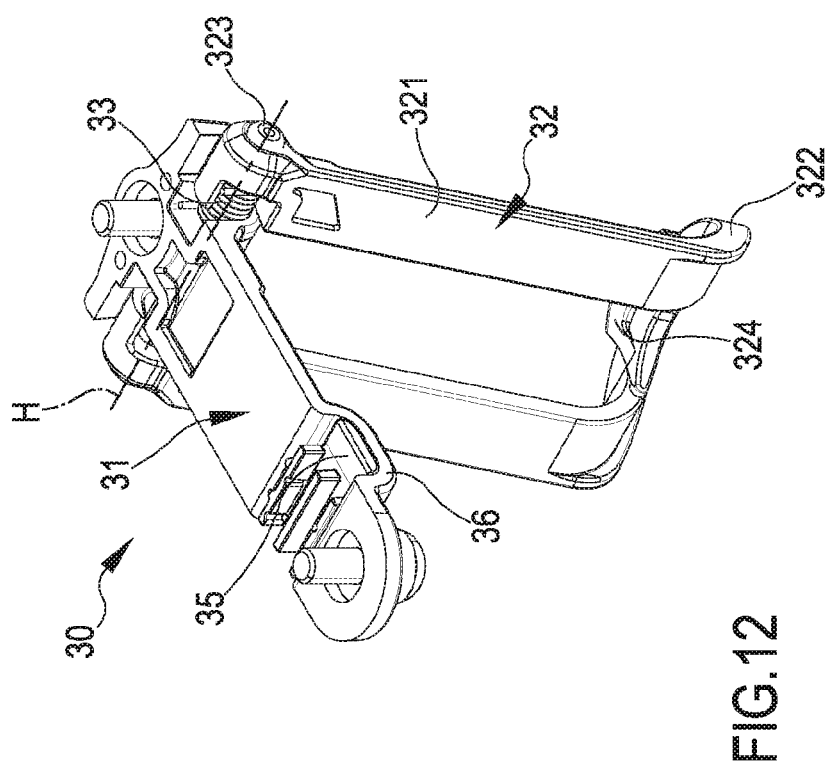

MOTORCYCLE BAG SUPPORTING AND TILTING KIT

The present invention relates to a supporting and tilting kit.

In the state of the art, supporting frames for motorcycle bags are known that fix the bag to the frame without being able to tilt it.

When a motorcycle mounts an upper supporting frame for any upper bag and at least one lateral supporting frame for at least one lateral bag, it is not possible to completely open the lid of the lateral bag as the opening is constrained by the presence of the upper bag mounted with the upper supporting frame. To open the lateral bag it is necessary to dismount the lateral bag from the lateral supporting frame, or dismount the upper bag from the upper supporting frame.

An object of the present invention is that of realising a supporting and tilting kit per lateral bags so that the lids of the lateral bags can be completely opened even in the presence of a bag mounted with an upper supporting frame, that the kit assures a secure support for the bag even when the bag is tilted, that the kit allows the bag to remain engaged with the supporting frame also in the tilted position.

According to the invention, such object is achieved with a supporting and tilting kit according to claim 1.

Other features are envisaged in the dependent claims.

The features and advantages of the present invention will be more apparent from the following description, which is to be understood as exemplifying and not limiting, with reference to the appended schematic drawings, wherein:

FIG. 1 shows a plan view from the rear of a motorcycle which mounts two supporting and tilting kits per bags arranged laterally to the motorcycle according to the present invention in a tilted configuration, each kit comprises a lateral supporting frame, each of which mounts a bag, the motorcycle also mounts an upper supporting frame which mounts another bag;

FIG. 2 is a perspective view of the supporting and tilting kit in the travel configuration, wherein said supporting and tilting kit comprises said supporting frame comprising four tubular elements, wherein a first upper tubular element mounts a first upper supporting means engaged with an upper portion of the bag, wherein a second lower tubular element mounts two second lower supporting means, each of which is engaged with a respective lower engaging means mounted with the bag, a tilting device comprises a supporting base mounted with the bag and a hooked element pivoted with the supporting base in the disengaged position, the supporting base comprising a slider mounted slidably in the engaging position with the hooked element;

Figure 6:
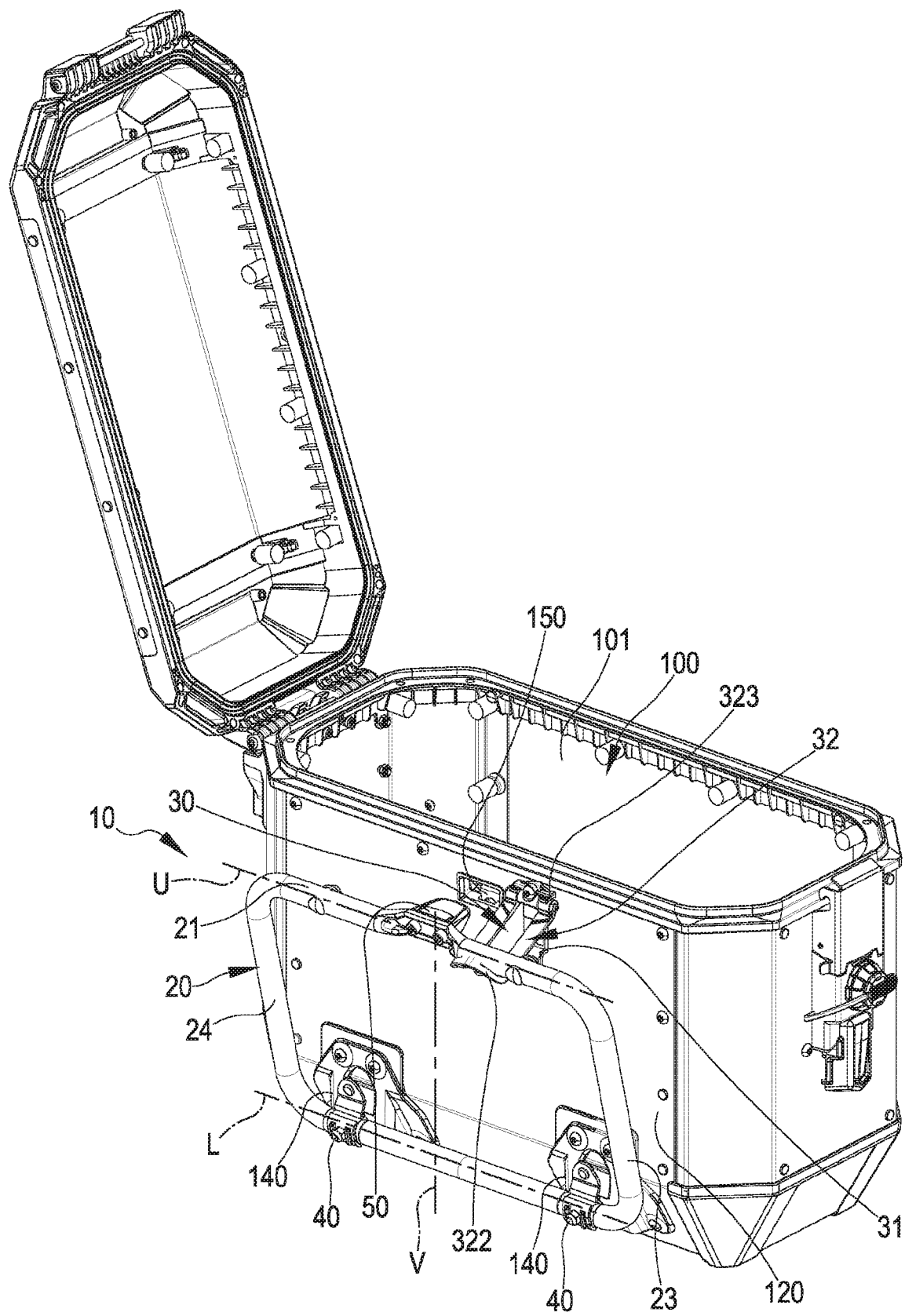
Figure 7:
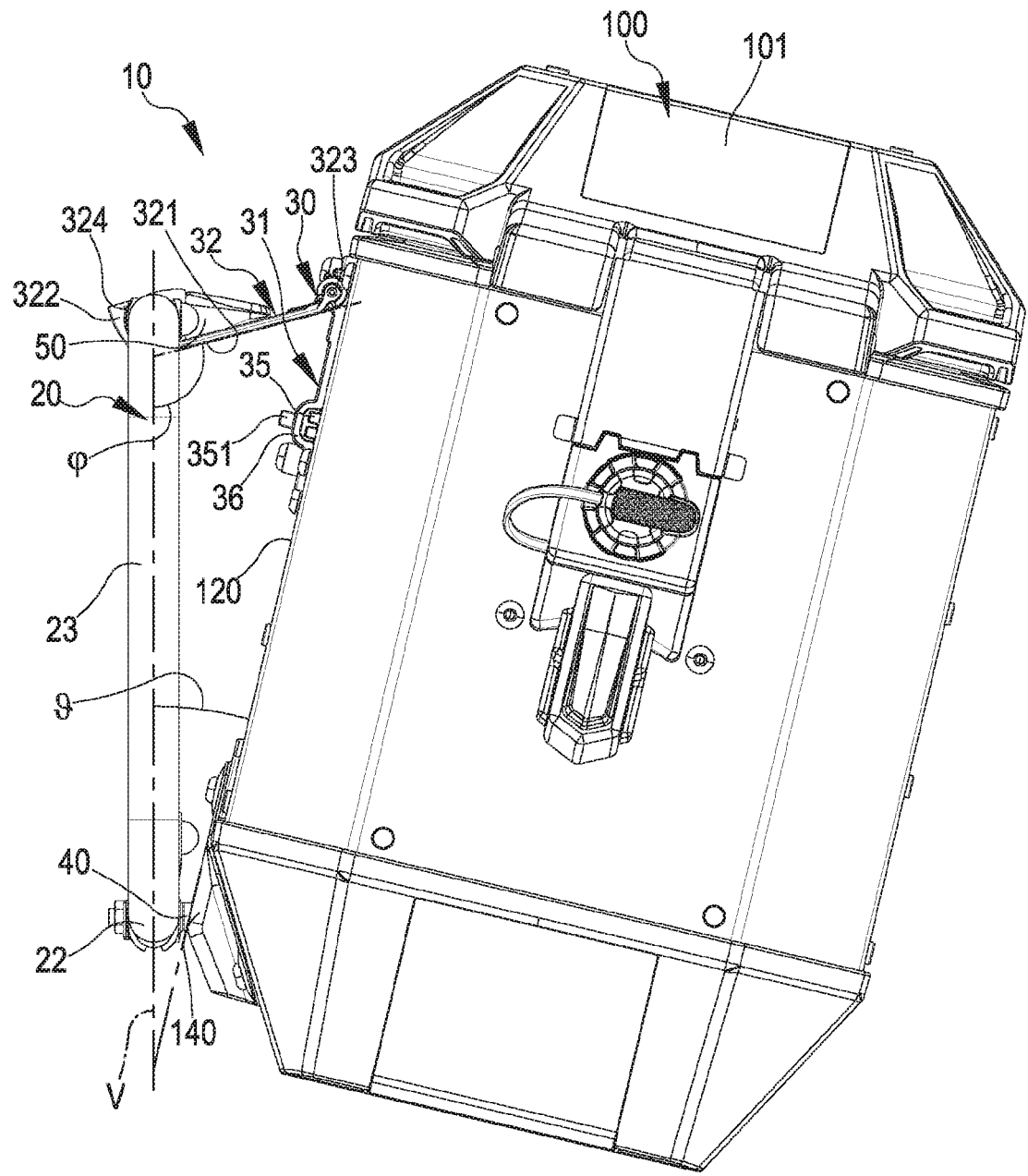
Figure 8:
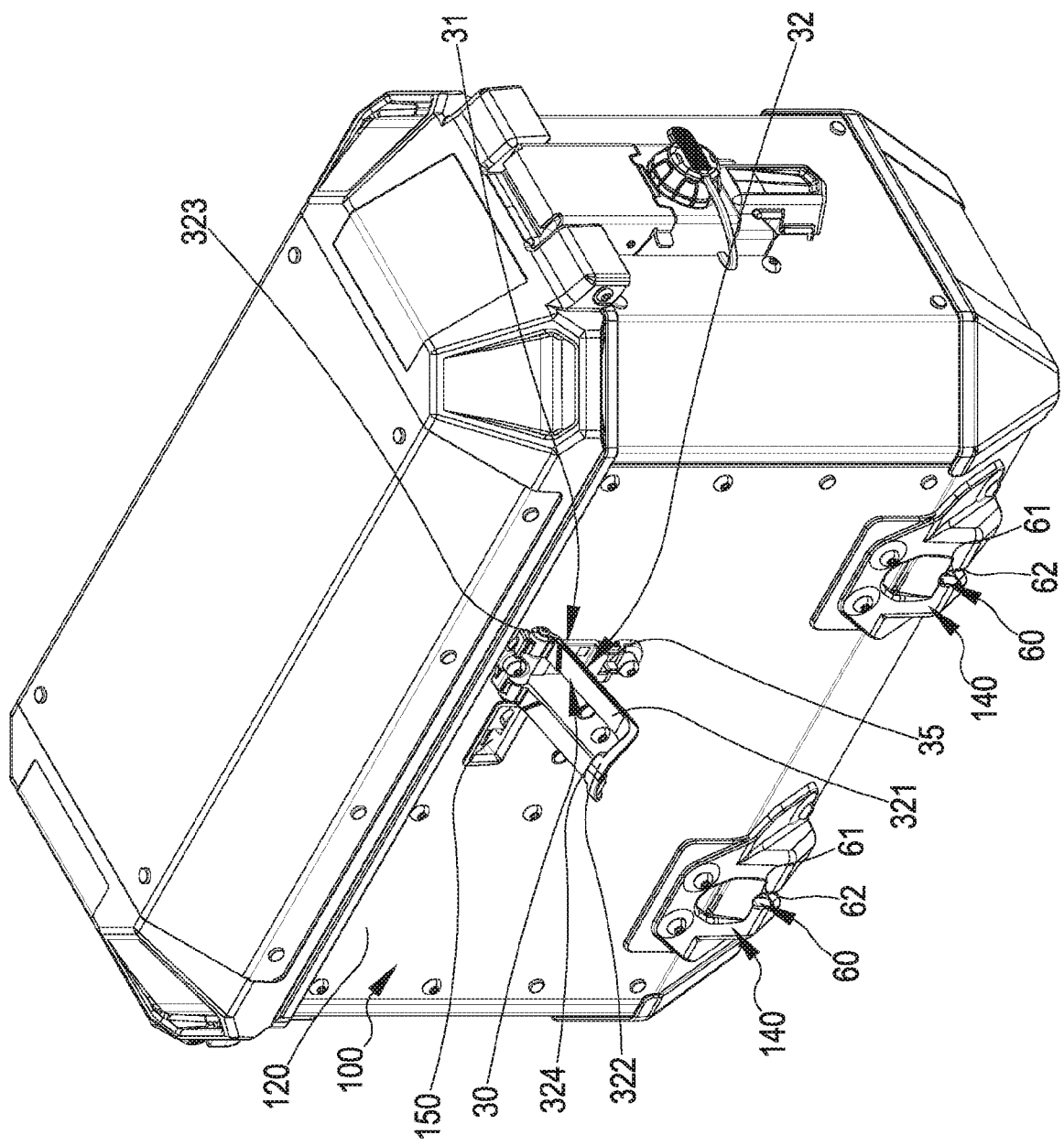
Figure 15:
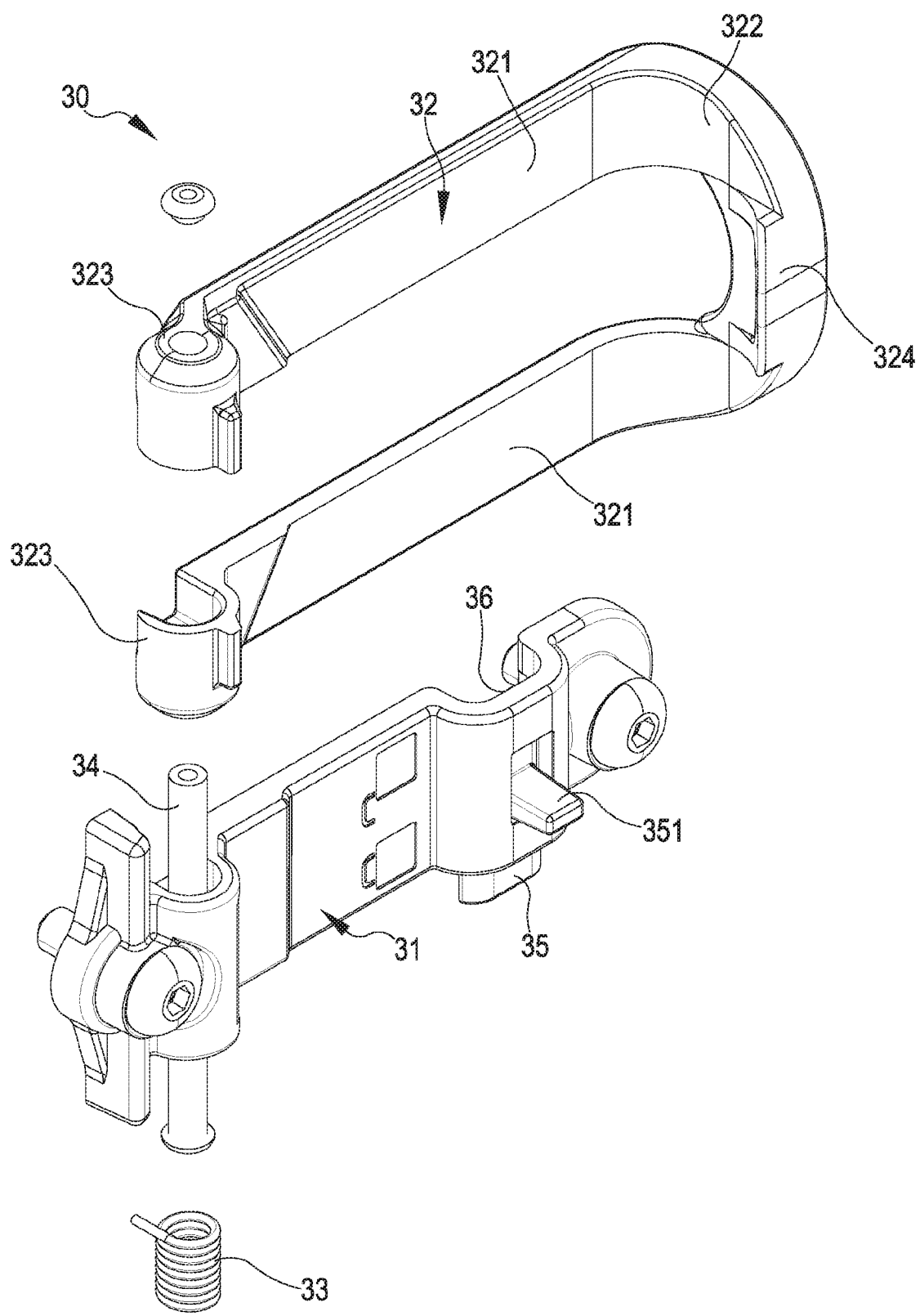
Figure 16:
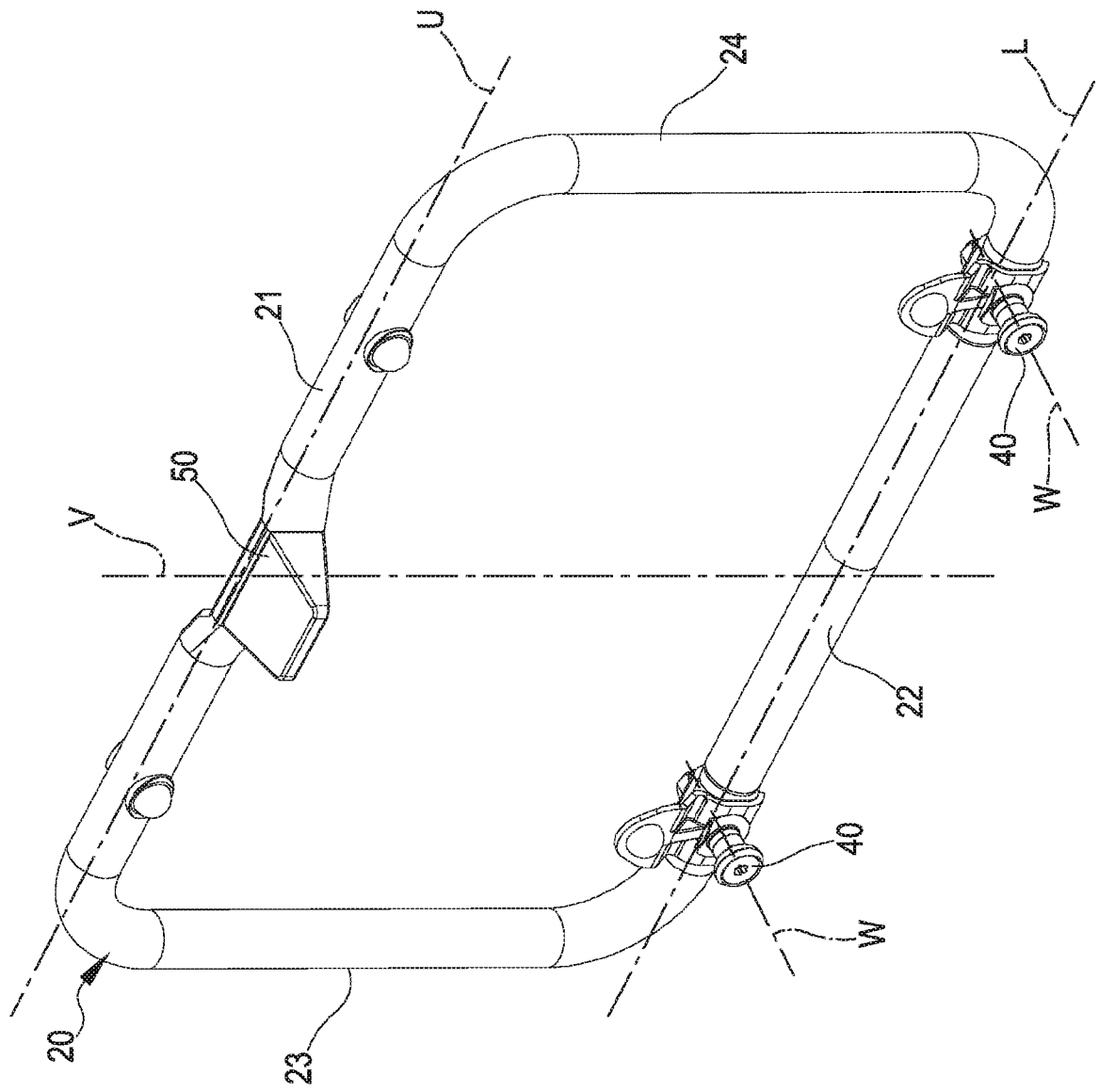
Figure 17:
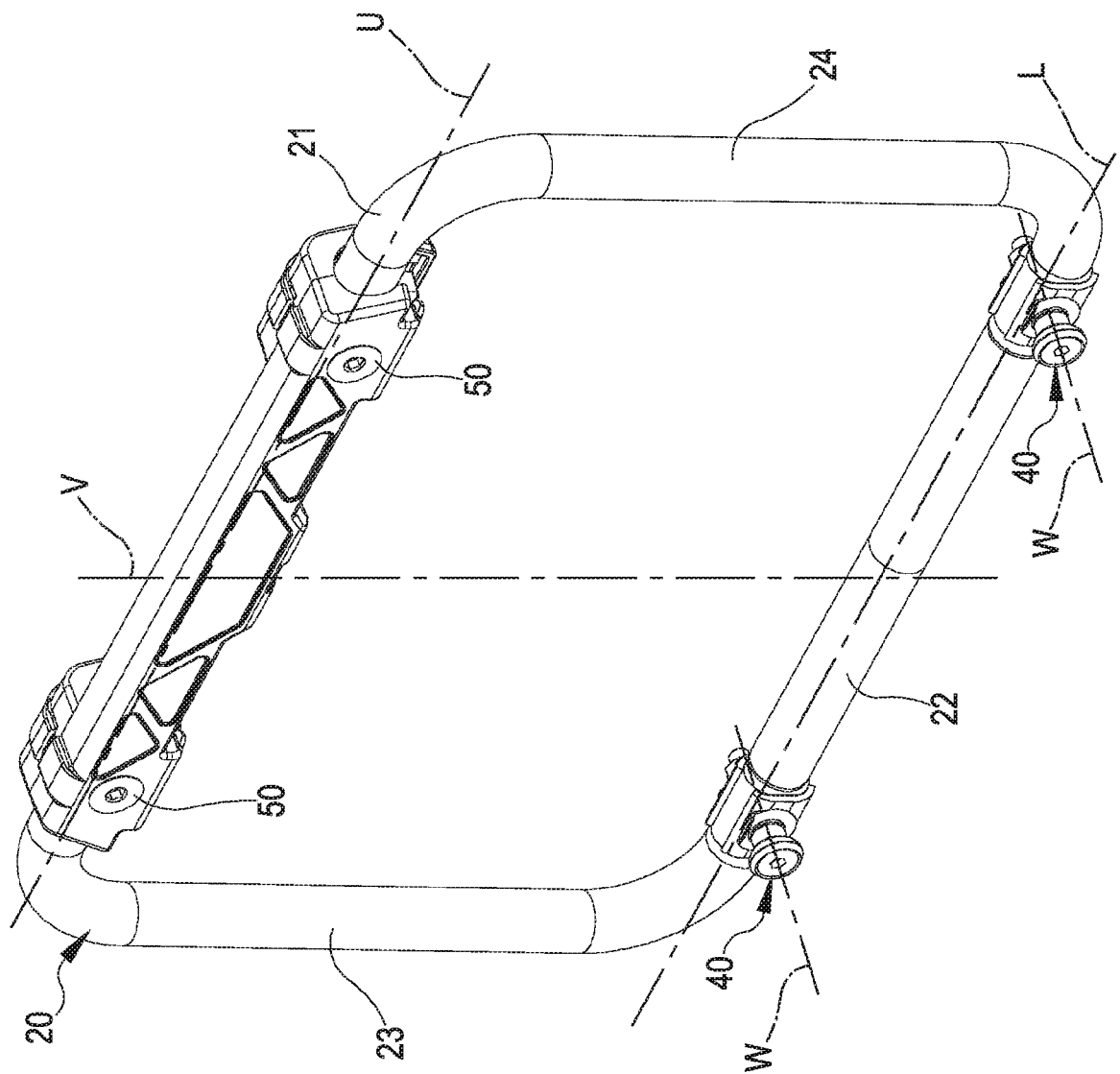
Figure 18:
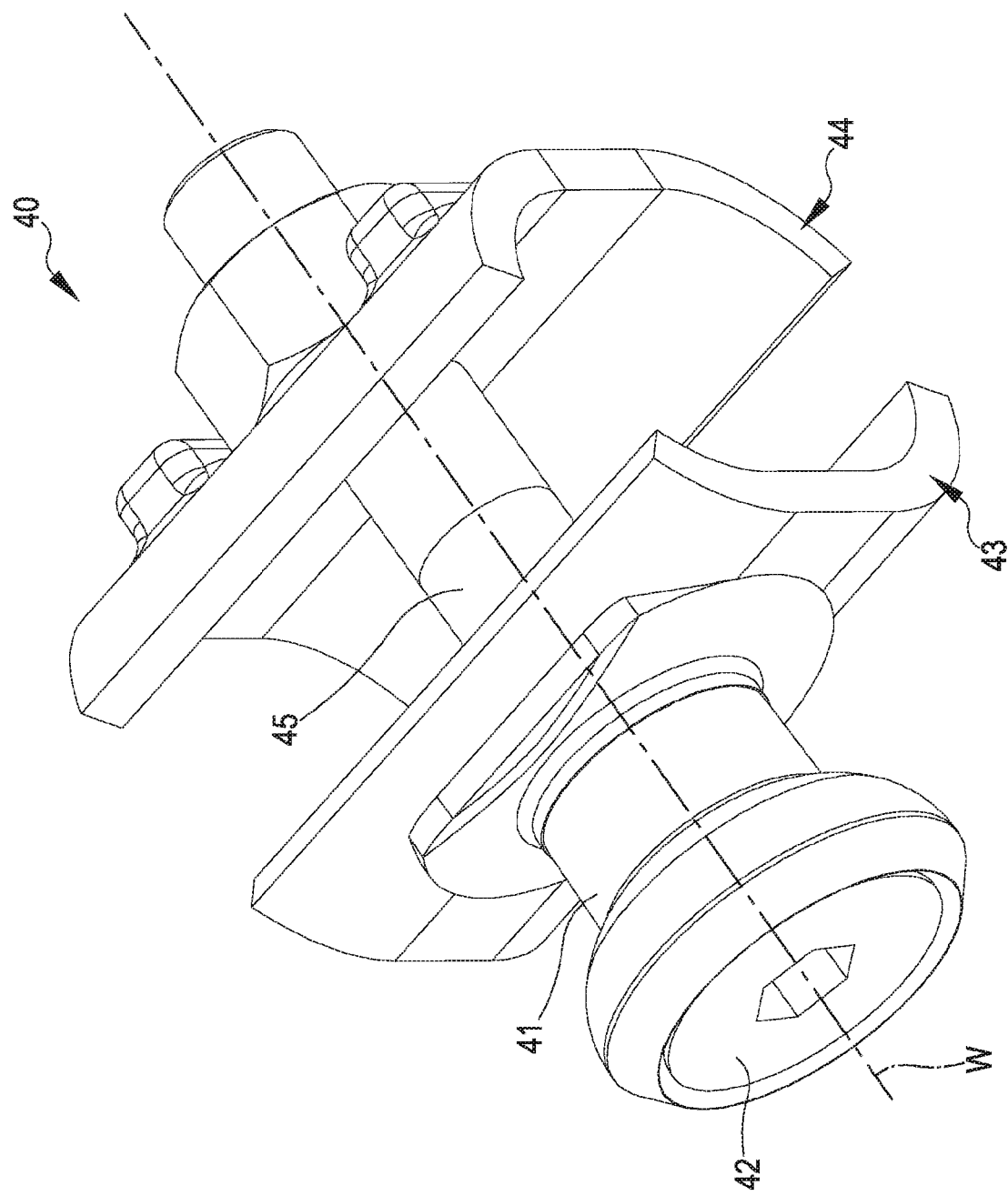

FIG. 6 shows a perspective view of the supporting and tilting kit in the tilted configuration, the first upper supporting means is disengaged from the bag and the two second supporting means remain engaged with respective second lower engaging means mounted with a lower portion of the bag, wherein the bag is tilted at an angle with respect to a vertical geometric axis, the hooked element of the tilting and supporting device is in the engaged position with the first upper tubular element, the bag is open;

FIG. 7 is a lateral plan view of FIG. 6, but with the bag closed;

FIG. 8 shows a perspective view of the bag dismounted from the supporting frame, wherein the bag mounts the tilting device with the slider in the disengaging position and the hooked element rotated on a pin upwards in a position adapted to hook the hooked element with the first upper tubular element;

FIG. 9 shows a perspective view from below of the tilting and supporting device with the hooked element in the disengaged position and with the slider in the engaging position with the supporting base;

FIG. 10 is a lateral plan view of FIG. 9;

FIG. 11 is a plan view from above of FIG. 9;

FIG. 12 shows a perspective view from below of the tilting and supporting device with the hooked element in the engaged position and with the slider in the disengaging position from the supporting base;

FIG. 13 is a lateral plan view of FIG. 12;

FIG. 14 is a plan view from above of FIG. 12;

FIG. 15 shows an exploded view of the tilting and supporting device which shows a pin and a torsion spring;

FIG. 16 shows a perspective view of the supporting frame that mounts the first upper supporting means and two second lower supporting means, wherein each second lower supporting means comprises a stem which comprises a head of greater transverse dimensions with respect to transverse dimensions of the stem;

FIG. 17 shows a perspective view of an alternative supporting frame to the one shown in FIG. 16 which mounts two first upper supporting means;

FIG. 18 shows a perspective view of the second lower supporting means.

Figure 1:
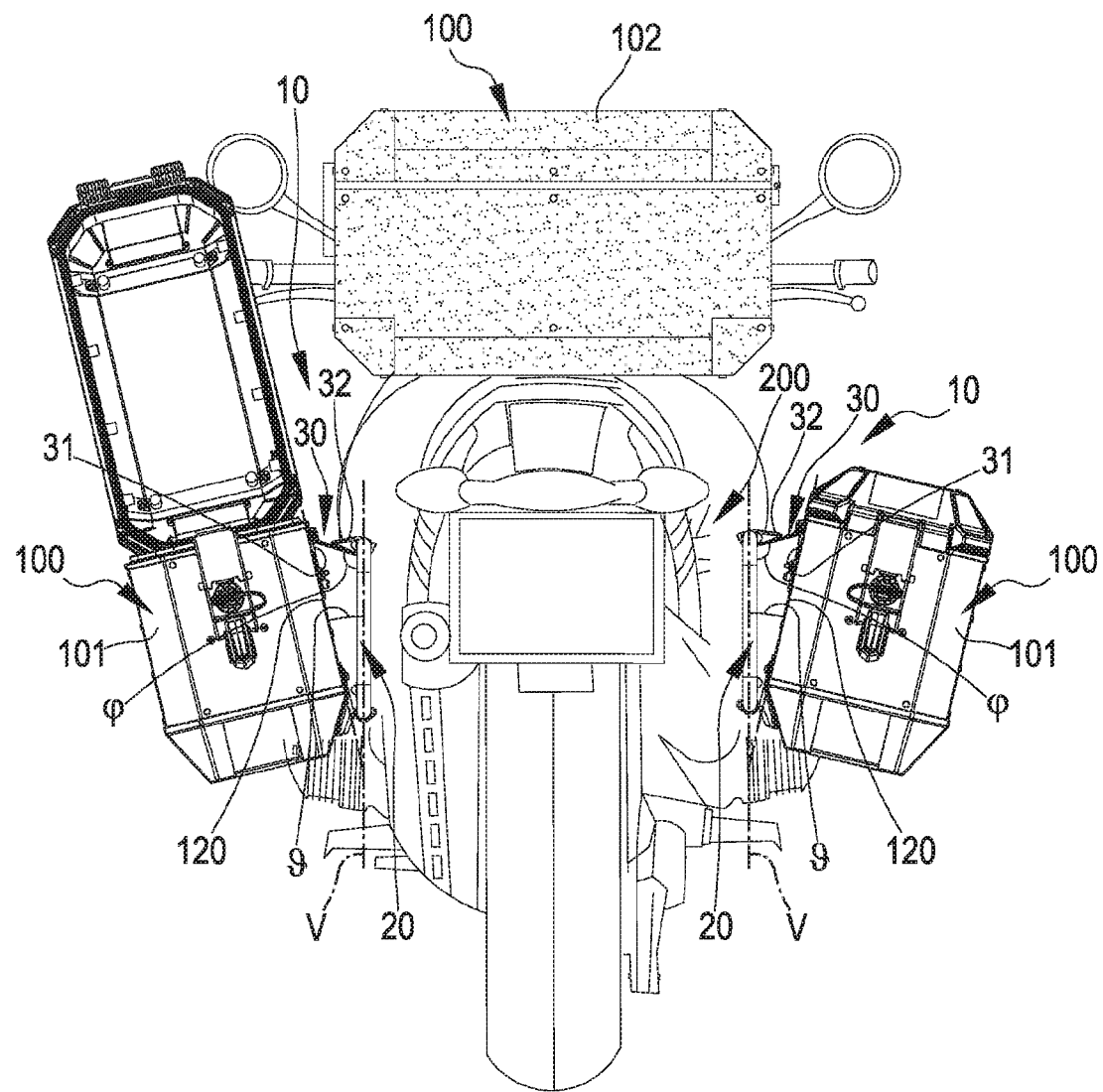

With reference to the aforementioned figures and in particular FIG. 1, a motorcycle is shown that mounts two supporting and tilting kits 10 for bags 100, 101 arranged laterally on the motorcycle. Each of the two kits 10 is in the tilted configuration. Each kit 10 comprises a lateral supporting frame 20, each of which mounts a lateral case 101. The motorcycle also mounts an upper supporting frame 20 which mounts another upper bag 100, 102.

The supporting and tilting kit 10 for at least one bag 100, 101 of a motorcycle is mounted laterally in the figures.

The supporting frame 20 is adapted to be associated to a frame 200 of said motorcycle.

Said supporting frame 20 comprises at least two tubular elements 21-24, a first tubular element 21 and a second tubular element 22.

As shown in particular in FIGS. 1-3, 6, 7 and 16 said first tubular element 21 is an upper portion of said supporting frame 20 and said second tubular element 22 is a lower portion of said supporting frame 20.

The supporting frame 20 shown in the figures comprises four tubular elements 21-24.

Said first tubular element 21 is spaced from said second tubular element 22. Said first tubular element 21 is arranged along a first upper geometric axis U and said second tubular element 22 is arranged along a second lower geometric axis L, wherein said first geometric axis U is parallel to said geometric axis L.

The supporting and tilting kit 10 comprises supporting means 40, 50 mounted with said supporting frame 20 and adapted to be separably engaged with said at least one bag 100, 101.

Said supporting means 40, 50 comprise at least a first upper supporting means 50 mounted with said first upper tubular element 21 and at least a second lower supporting means 40 mounted with said second lower tubular 22.

The kit 10 comprises engaging means 150, 140 mounted with said at least one bag 100, 101.

Said engaging means 140, 150 shown in the figures comprise a first upper engaging means 150 adapted to be engaged with said at least a first upper supporting means 50 and two second lower engaging means 140, each second lower engaging means 140 is adapted to be engaged with said at least a second supporting means 40.

The upper engaging means 150 is contained inside the bag 100. The upper supporting means 50 passes through an upper through opening in the bag 100 and is adapted to be engaged by the first upper engaging means 150.

As shown in particular in FIGS. 1-8, said first engaging means 150 is mounted with an upper portion of said at least one bag 100, 101 and said second engaging means 140 is mounted with a lower portion of said at least one bag 100, 101.

As shown in particular in FIGS. 1-8, 16, 17, 18 said at least one second supporting means 40 mounted with said second lower tubular element 22 comprises a stem 41 which extends along a longitudinal axis W from said second tubular element 22. Said stem 41 comprises a head 42. Said head 42 is of greater transverse dimensions with respect to transverse dimensions of said stem 41. The transverse dimensions are measured on a transverse geometric plane which is perpendicular to said longitudinal axis W along which the stem 41 extends.

As shown in the figures said head 42 has a mushroom shape adapted to be quickly connected to a complementary opening 60 of the second lower engaging means 140.

As shown particularly in FIG. 18 the second lower supporting means 40 comprises a support clamp comprising a first jaw 43 adapted to embrace a first portion of said second lower tubular element 22. The first jaw 43 comprises a first through hole, the support clamp of the second supporting means 40 comprises a second jaw 44 which embraces a second portion of said second tubular element 22 and also said second jaw 44 comprises a second through hole.

The second supporting means comprises a guide screw 45 comprising the head 42 and the stem 41 of a cylindrical body shape which comprises at least a threaded portion.

Said guide screw 45 is mounted through said first through hole of said first jaw 43, through a through hole of said second tubular element 22, through said second through hole of said second jaw 44.

Figure 5:
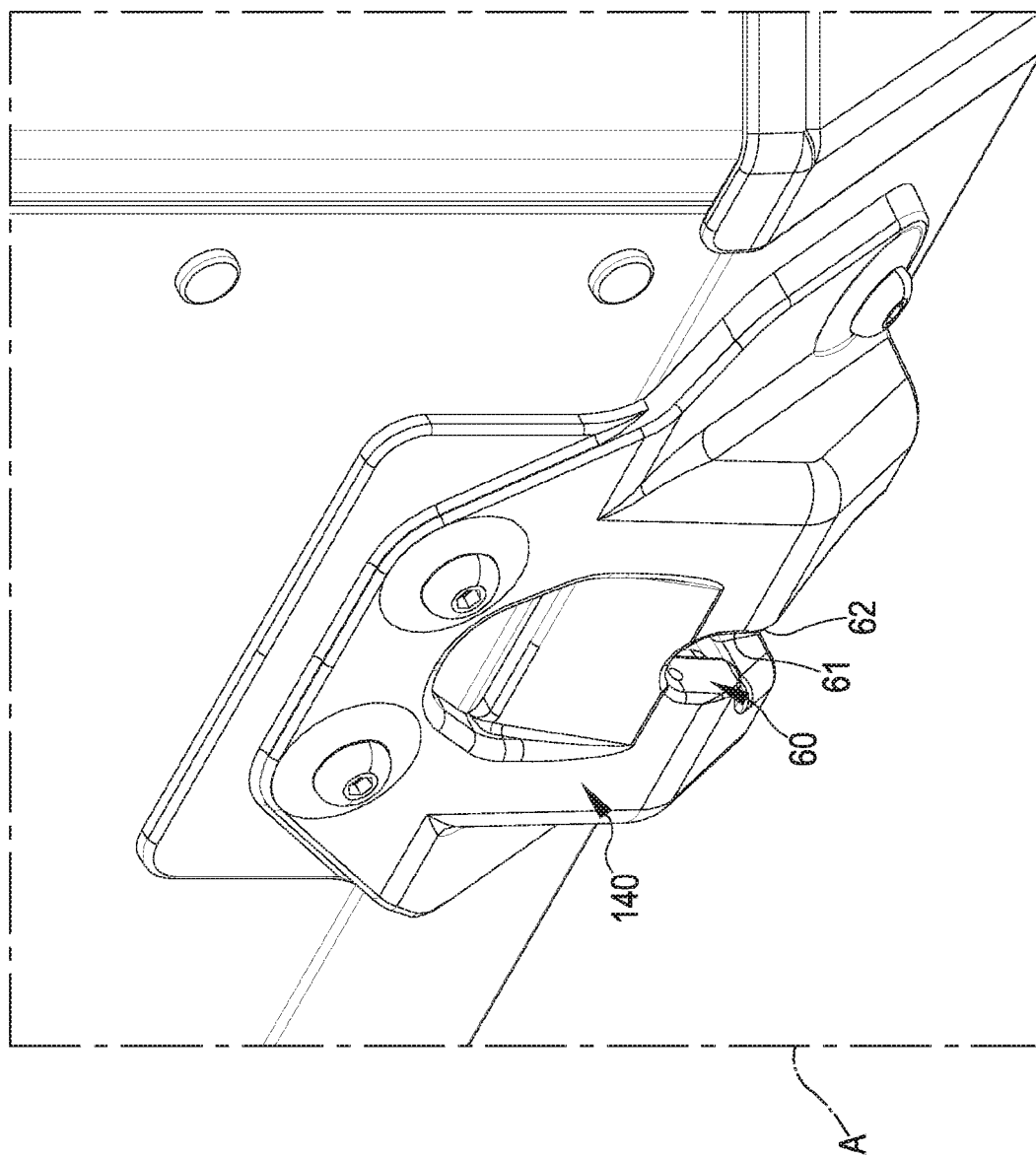
FIG. 5 is an enlarged view of FIG. 4 and shows a second lower engaging means comprising an opening comprising a first portion and a second portion of a larger size than the first opening portion.

As shown particularly in FIG. 5, said at least a second engaging means 140 comprises said opening 60. Said opening 60 comprises a first portion 61 adapted to allow an insertion of said stem 41 of said second supporting means 40 and a second portion 62 of greater dimensions than said first portion 61 and adapted to permit the insertion of said head 42 of said second supporting means 40.

Said second supporting means 40 is adapted to pass from an engaging configuration with said second engaging means 140 to a disengaging position of said second engaging means 140.

Said engaging configuration of said second supporting means 40 provides that said stem 41 is inserted in said first portion 61 of said opening 60 and that said head 42 is flush against edge walls of said first portion 61 of said opening 60 to prevent the second supporting means 40 from disengaging from said opening 60 of the second engaging means 140.

Advantageously the head 42 of the second supporting means 40 allows the bag 100, 101 to tilt maintaining the second supporting means 40 engaged with said second engaging means 140.

Said disengaging configuration of said second supporting means 40 provides that said stem 41 is disengaged from said first portion 61 of said opening 60 and that said head 42 can pass through said second portion 62 of said opening 60.

As shown in particular in FIGS. 9-15, the kit 10 comprises a tilting device 30 comprising a supporting base 31 mounted with said at least one bag 100, 101 and at least one hooked element 32.

Said hooked element 32 comprises two spacer arms 321. Each spacer arm 321 comprises a first end 323 pivoted with said supporting base 31. A second end of the two spacer arms 321 comprises a hook portion 322 adapted to engage said first tubular element 21.

Said hooked element 32 is adapted to rotate pivoted from a disengaged position to a engaged position.

Figure 2:
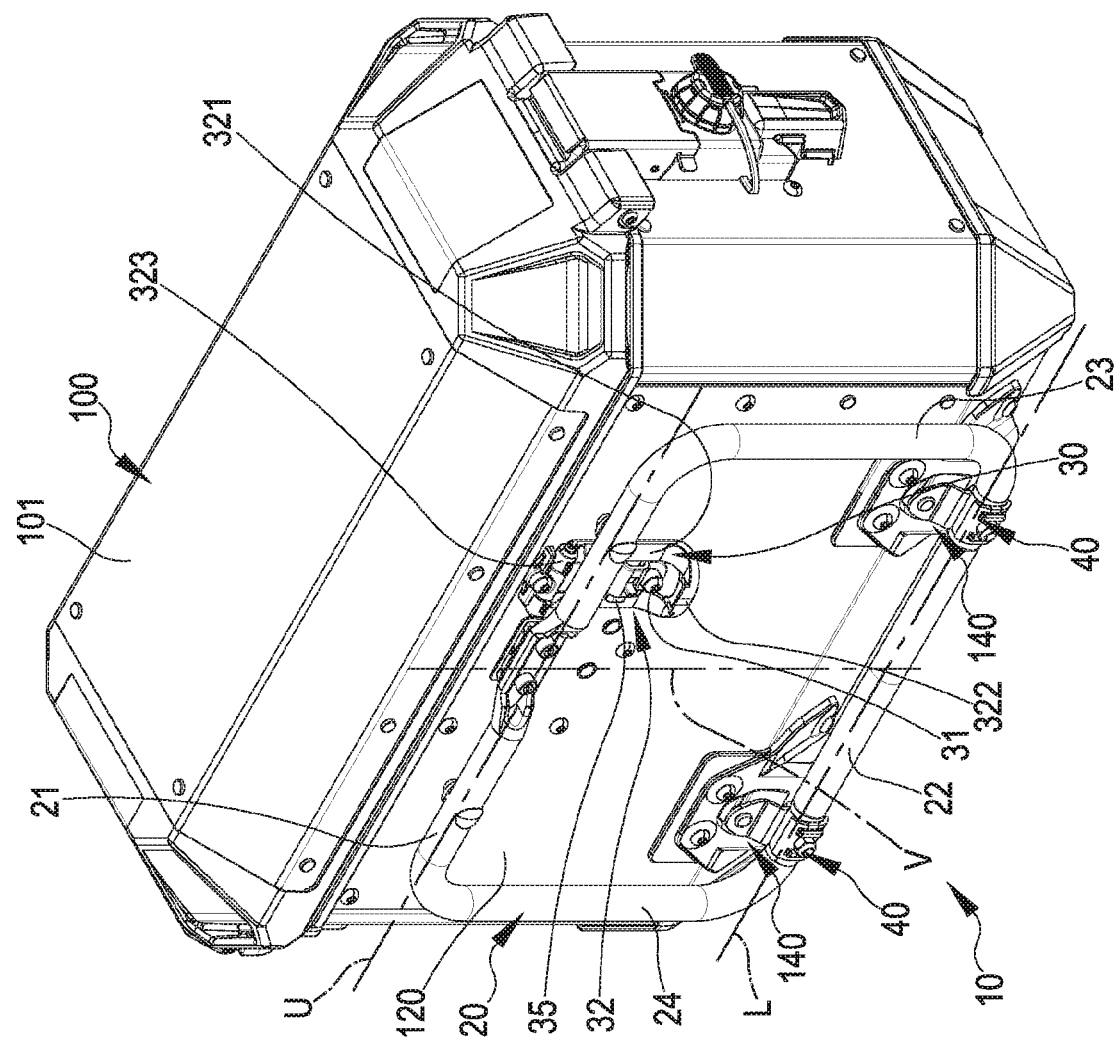
Figure 3:
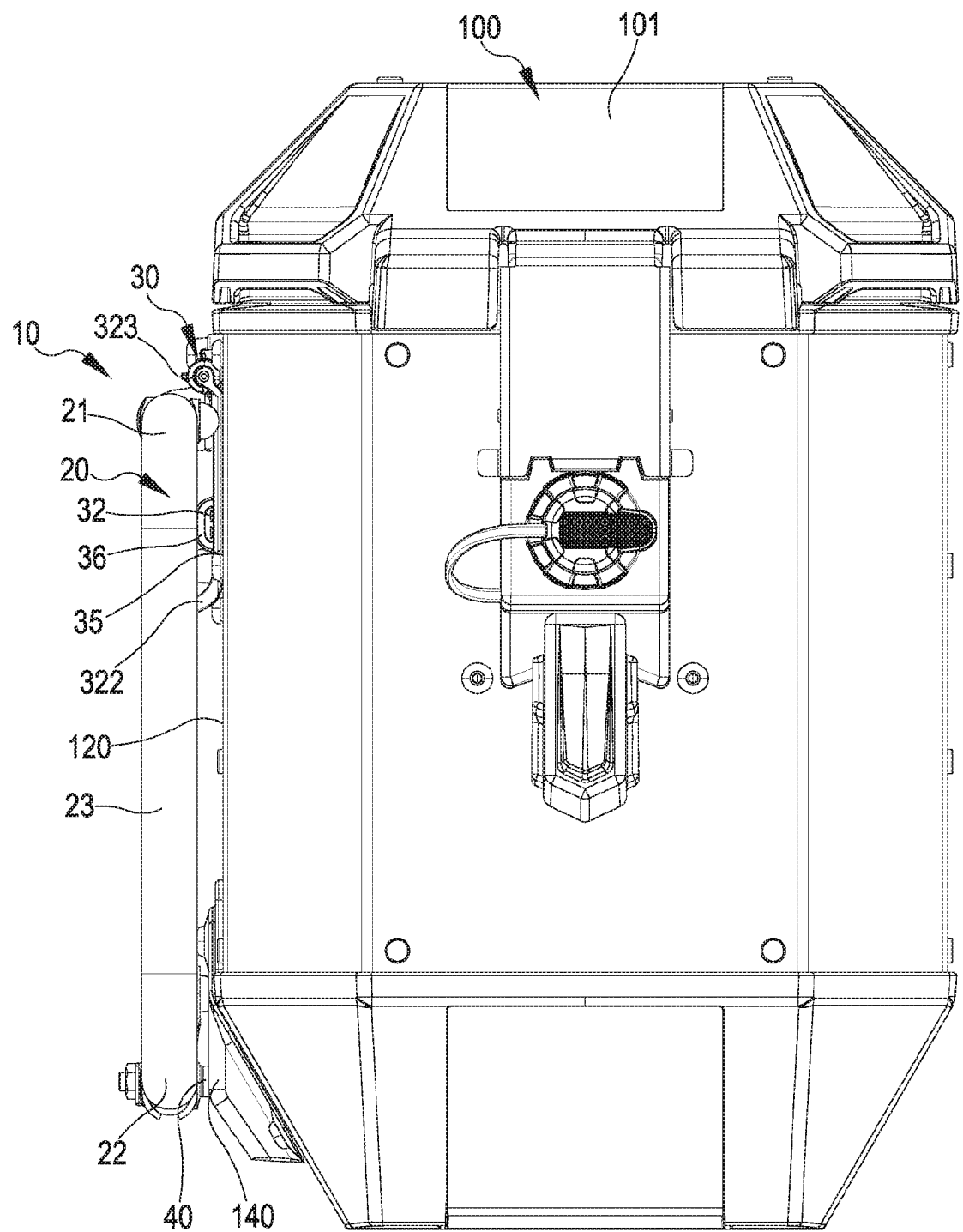
FIG. 3 is a side plan view of FIG. 2.
Figure 4:
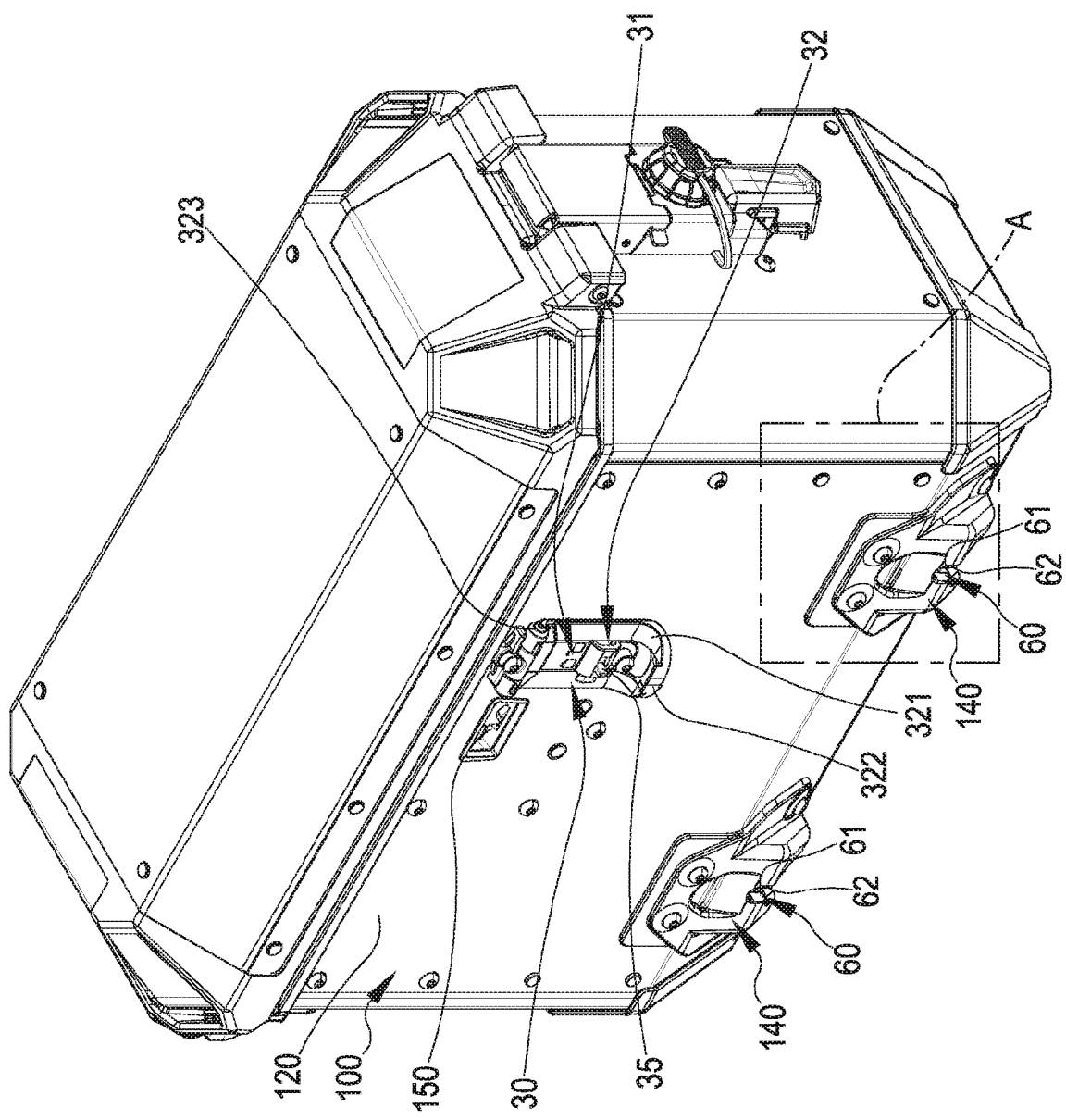
FIG. 4 shows a perspective view of the bag dismounted from the supporting frame, wherein the bag mounts the tilting device with the slider in the engaging position with the hooked element and wherein the bag comprises a lower portion which mounts two second lower engaging means.

Said disengaged position of said hooked element 32 provides that said hook portion 322 is disengaged from said first tubular element 21 as shown in FIGS. 2-4.

Said engaged position of said at least one hooked element 32 provides that said hook portion 322 is engaged to said first tubular element 21 as shown in FIGS. 1, 6-8.

Said supporting and tilting kit 10 being adapted to switch from a travel configuration to a tilted configuration.

As shown in FIGS. 2 and 3 said travel configuration of said supporting and tilting kit 10 provides that said at least a first supporting means 50 and said at least a second supporting means 40 are engaged with said at least one bag 100, 101 and that said hooked element 32 of said tilting device 30 is in said disengaged position.

As shown in FIGS. 1, 6 and 7 said tilted configuration of said supporting and tilting kit 10 provides that said first supporting means 50 is disengaged from said bag 100, 101, that said second supporting means 40 is engaged with said bag 100, 101, that said bag 100, 101 is tilted at an angle θ with respect to a third geometric axis V and that said hooked element 32 is in said engaged position.

Said third geometric axis V is coplanar to a geometric plane passing through said first geometric axis U and through said second geometric axis L, wherein said third geometric axis V is perpendicular to said first U and said second geometric axis L.

As shown in FIG. 1 if the supporting and tilting kit 10 is mounted laterally to the frame 200 of the motorcycle, then the third geometric axis V is a vertical axis perpendicular to the ground.

The angle θ is between 0 and 60 sexagesimal degrees.

A constraint to the extension of the angle θ depends on the length of the spacer arms 321 of the hooked element 32 of the tilting device 30.

Another constraint to the extension of the angle θ depends on the length of the stem 41 and the transverse dimensions of the head 42 of the second supporting means 40, as the dimensions of the stem 41 and of the head 42 limit the maximum engaging angle between the second supporting means 40 and the second engaging means 140. Beyond said maximum engaging angle the bag 100, 101 is disengaged at least at the bottom from the supporting frame 20.

As shown in particular in FIGS. 9-15 said first end 323 of said spacer arms 321 of said tilting device 30 is pivoted with said supporting base 31 by means of a pin 34 which mounts a torsion spring 33.

Said pin 34 is arranged along a fourth geometric axis H, wherein said fourth geometric axis H is parallel to a said first geometric axis U and consequently is parallel to said second geometric axis L.

Said torsion spring 33 switches from a position of higher torsion to a position of lower torsion to make said hooked element 32 rotate around the pin 34.

Said position of higher torsion of said torsion spring 33 corresponds to said disengaged position of said at least one hooked element 32.

Said position of lower torsion of said torsion spring 33 corresponds to said engaged position of said at least one hooked element 32.

Said supporting base 31 comprises a slider 35 slidably mounted with said supporting base 31. Said slider 35 is adapted to pass from an engaging position with said hooked element 32 to a disengaging position from said hooked element 32 leaving the hooked element 32 free to rotate pivoted around the fourth geometric axis H.

As shown in particular in FIGS. 9-11 said engaging position of said at least one slider 35 corresponds to said disengaged position of said at least one hooked element 32 and provides that at least a portion of said at least a slider 35 is engaged with at least a portion of said at least one hooked element 32 to lock its pivoted rotation.

As shown in particular in FIGS. 12-14 said disengaging position of said at least one slider 35 corresponds with said engaged position of said at least one hooked element 32 and provides that said at least one slider 35 is disengaged from said at least one hooked element 32 allowing the pivoted rotation.

The slider 35 is slidably mounted with a seat 36 of the supporting base 31. Said seat 36 extends outwards so that the slider 35 in the engaging position of at least a portion of the slider 35 is above an external surface of at least one of the two spacer arms 321 to lock the hooked element 32 in the disengaged position.

The seat 36 comprises an upper through opening from which an upper portion of the slider protrudes, which is a lever 351 which extends from the slider in an external direction to the bag 100, 101. Said lever 351 is used to manually slide the slider 35 from the engaging position to the disengaging position with the hooked element 32 and vice versa.

It is also provided that the lever 351 comprises a safety catch to prevent the slider 35 from moving accidentally from one position to the other.

As shown in particular in FIGS. 9-15 said hook portion 322 of said spacer arms 321 comprises a wall of a shape complementary to a shape of said first tubular element 21 of said supporting frame 20. When said hook portion 322 is engaged with said first tubular element 21, then the wall of a complementary shape adheres for at least a portion with an external surface of said first tubular element 21.

Said hook portion 322 of said spacer arms 321 comprises a fin 324 which protrudes from an end of said wall of a complementary shape in the direction of said fourth geometric axis H. Said fin 324 advantageously allows the first tubular element 21 to be embraced more securely.

The first end 323 of the hooked element 32 pivoted with said supporting base 31 is envisaged to be arranged on an upper portion of the bag 100, 101 so that once the slider 35 passes from the engaged position to the disengaged position from the hooked element 32, the hooked element 32 can rotate pivoted and pushed by the torsion spring 33 from said disengaged position wherein the hooked element 32 is adhering to a rear face 120 of the bag 100, 101 to the engaged position of said hooked element 32 with said first tubular element 21. Said hook portion 322 of the hooked element 32 engages the first tubular element 21 from below. The complementary wall of the hook portion 322 and the fin 324 embrace the first tubular element 21 for at least a portion of the diameter of the first tubular element 21.

As shown in particular in FIG. 7 in the tilted configuration of the kit 10 a second angle φ between the third geometric axis V and the spacer arms 321 is preferably an angle greater than 90 sexagesimal degrees so that the spacer arms 90 hangs from the top downwards, wherein the first end 323 pivoted with said supporting base 31 is arranged at a height greater than the second end of the hook portion 322 engaged with said first tubular element 21. The height is measured in respect of the third geometric axis V starting from the second geometric axis L and going towards the first geometric axis U.

Said supporting base 31 of the tilting device 30 is mounted with the rear face 120 of the bag 100, 101 facing the supporting frame 20. Said engaging means 140 and 150 are provided mounted with the rear face 120 of the bag 100, 101.

Advantageously the supporting and tilting kit 10 for bags 100 provides that a lid of the bag 100 can be completely opened even in the presence of a bag mounted so as to lock the opening of the lid when the kit 10 is in the travel configuration.

Advantageously the kit 10 ensures a secure support for the bag 100 even when the bag 100 is tilted.

Advantageously the kit 10 allows the bag 100 to remain engaged with the supporting frame 20 also in the tilted position.

Alternatively, it is possible to provide that the supporting frame 20 comprises only the first tubular element 21 and the second tubular element 22.

Alternatively, it is possible to provide that the bag 100 can also mount two or more tilting devices 30.

Alternatively, it is possible to provide that the supporting and tilting kit 10 per at least a bag 100, 101 of a motorcycle can be mounted above the motorcycle in place of the upper supporting frame 20 in order to be able to tilt the upper bag 102 in respect of a geometric plane defined by the supporting frame 20. In this alternative the first tubular element 21 is frontal, while the second tubular element 22 is posterior and the upper bag 100, 102 tilts by the angle θ upwards. Again alternatively depending on how we wish to tilt the bag, the first tubular element 21 is posterior and the second tubular element 22 is frontal.

Alternatively, it is possible to provide that the lateral bag 101 can be tilted towards the front or the rear and in this case the first tubular element 21 and the second tubular element 22 are lateral tubular elements of the supporting frame 20.

Alternatively, it is possible to provide that the bag 100, 101, 102 is replaced by an object of equivalent dimension, for example a tank or a saddle bag or other accessory of equivalent dimensions to those of a bag.

Alternatively, it is possible to provide that the supporting means 40, 50 are engaged directly with the bag 100 without engaging means 150, 140. In this alternative it is possible to provide that the openings 60 for engaging the second supporting means 40 are made in the bag 100.

Alternatively, as shown in FIG. 17 there are two first supporting means 50 which provide first alternative upper engaging means 150 which are engaging screws which are engaged in respective threaded through holes made in the bag 100.

Alternatively the second angle φ between the third geometric axis V and the spacer arms 321 is between 10 and 170 sexagesimal degrees.

Alternatively, it is possible to provide that the supporting frame 20 is a sheet or plate adapted to be associated to the frame 200 of said motorcycle, wherein said alternative supporting frame 20 comprises at least two portions 21-24, a first portion 21 and a second portion 22, wherein said first portion 21 is spaced from said second portion 22. Said first portion 21 is an upper portion of the supporting frame 20 and said second portion 22 is a lower portion of the supporting frame 20. Said first portion 21 is arranged along the first geometric axis U and said second portion 22 is arranged along the second geometric axis L, dove said first geometric axis U is parallel to said second geometric axis L.

Again alternatively it is provided that said supporting frame 20 is integral with said frame 200 of said motorcycle, so that the supporting means 40, 50 are mounted with said frame 200 of the motorcycle.

Alternatively the torsion spring 33 may be replaced by another equivalent elastic element, or the pin 34 and spring 33 system may be replaced by a counterweight without spring.

Alternatively it is provided that said at least one slider 35 is rotatably mounted with said supporting base 31 and is adapted to pass from said engaging position with said at least one hooked element 32 to said disengaging position from said at least one hooked element 32.

Alternatively said supporting means 40, 50 are mounted with said at least one bag 100, 101, 102, wherein said at least a first supporting means 50 is mounted with said first portion of said at least one bag 100, 101, 102 and said at least a second supporting means 40 is mounted with said second portion of said at least one bag 100, 101, 102.

Alternatively said supporting base 31 of said at least one tilting device 30 is mounted with said supporting frame 20, wherein said hook portion 322 is adapted to engaging said first portion of said at least one bag 100, 101, 102.

The invention thus conceived is susceptible to many modifications and variants, all falling within the same inventive concept; furthermore, all details can be replaced by equivalent technical elements. In practice, the materials used, as well as the dimensions thereof, can be of any type according to the technical requirements.

The invention claimed is:

1. A supporting and tilting kit for at least one bag of a motorcycle, said supporting and tilting kit comprises
    a supporting frame adapted to be associated with a frame of said motorcycle, wherein said supporting frame comprises at least two portions, a first portion and a second portion, wherein said first portion is spaced from said second portion, wherein said first portion is positioned along a first geometric axis, and said second portion is positioned along a second geometric axis, wherein said first geometric axis is parallel to said second geometric axis,
    supporting means are adapted to separably engage said supporting frame and said at least one bag, wherein said supporting means comprise at least a first supporting means adapted to engage said first portion of said supporting frame and a first portion of said at least one bag corresponding to said first portion of said supporting frame, and at least one second supporting means adapted to engage said second portion of said supporting frame and a second portion of said at least one bag corresponding to said second portion of said supporting frame,
    at least one tilting device comprising a supporting base and at least one hooked element, wherein said at least one hooked element comprises at least one spacer arm, comprising a first end pivoted with said supporting base and a second end, which comprises a hook portion adapted to engage said first portion of said supporting frame with said first portion of said at least one bag, said at least one hooked element being adapted to rotate pivoted from a disengaged position to an engaged position,
    said disengaged position of said at least one hooked element provides that said hook portion releases said first portion of said supporting frame from said first portion of said at least one bag,
    said engaged position of said at least one hooked element provides that said hook portion engages said first portion of said supporting frame to said first portion of said at least one bag,
    said supporting and tilting kit being adapted to switch from a travel configuration to a tilted configuration,
    said travel configuration of said supporting and tilting kit provides that said at least one first supporting means said at least one second supporting means engage said at least one bag with said supporting frame, and that said hooked element of said tilting device is in said disengaged position,
    said tilted configuration of said supporting and tilting kit provides that said at least one first supporting means disengages said first portion of said at least one bag from said first portion of said supporting frame, which said at least one second supporting means engages said second portion of said at least one bag with said second portion of said supporting frame, that said at least one bag is tilted at an angle with respect to a third geometric axis and that said hooked element is in said engaged position, wherein said third geometric axis is coplanar to a geometric plane passing through said first geometric axis and for said second geometric axis, wherein said third geometric axis is perpendicular to said first and said second geometric axis.

2. The supporting and tilting kit according to claim 1, wherein said supporting means are mounted with said supporting frame, wherein said at least one first supporting means is mounted with said first portion of said supporting frame and said at least one second supporting means is mounted with said second portion of said supporting frame.

3. The supporting and tilting kit according to claim 1, wherein said supporting means are mounted with said at least one bag, wherein said at least one first supporting means is mounted with said first portion of said at least one bag and said at least one second supporting means is mounted with said second portion of said at least one bag.

4. The supporting and tilting kit according to claim 1, wherein said supporting base of said at least one tilting device is mounted with said at least one bag, wherein said hook portion is adapted to engage said first portion of said supporting frame.

5. The supporting and tilting kit according to claim 1, wherein said hook portion of said spacer arm comprises a wall of a shape complementary to a shape of said first portion of said supporting frame.

6. The supporting and tilting kit according to claim 5, wherein said hook portion of said spacer arm comprises at least one fin, which protrudes from an end of said complementary shaped wall in the direction of the said fourth geometric axis.

7. The supporting and tilting kit according to claim 1, wherein said supporting base of said at least one tilting device is mounted with said supporting frame, wherein said hook portion is adapted to engage said first portion of said at least one bag.

8. The supporting and tilting kit according to claim 1, wherein said first end of said at least one spacer arm of said at least one tilting device is pivoted with said supporting base by means of a pin,
- wherein said pin is positioned along a fourth geometric axis, wherein said fourth geometric axis is parallel to said first geometric axis.

9. The supporting and tilting kit according to claim 8, wherein said pin mounts a torsion spring,
- wherein said torsion spring switches from a position of higher torsion to a position of lower torsion,
- wherein said position of higher torsion of said torsion spring corresponds to said disengaged position of said at least one hooked element,
- wherein said position of lower torsion of said torsion spring corresponds to said engaged position of said at least one hooked element.

10. The supporting and tilting kit according to claim 1, wherein said supporting base comprises at least one slider mounted with said supporting base, said at least one slider is adapted to switch from an engaging position with said at least one hooked element to a disengaging position from said at least one hooked element,
- wherein said engaging position of said at least one slider corresponds to said disengaged position of said at least one hooked element and provides that at least a portion of said at least one slider is engaged with at least one portion of said at least one hooked element to lock its pivoted rotation,
- wherein said disengaging position of said at least one slider corresponds with said coupling position of said at least one hooked element and provides that said at least one slider is disengaged from said at least one hooked element allowing the pivoted rotation.

11. The supporting and tilting kit according to claim 1, wherein said tilted configuration of said supporting and tilting kit provides that a second angle between said third geometric axis and said spacer arm is between 10 and 170 sexagesimal degrees.

12. The supporting and tilting kit according to claim 11, wherein said second angle is greater than 90 sexagesimal degrees.

13. The supporting and tilting kit according to claim 1, wherein it comprises engaging means mounted with said at least one bag, said engaging means comprising at least a first engaging means adapted to be engaged with said at least one first supporting means and at least one second engaging means adapted to be engaged with said at least one second supporting means.

14. The supporting and tilting kit according to claim 13, wherein said first engaging means is mounted with said first portion, which is an upper portion of said at least one bag and said second engaging means is mounted with said second portion, which is a lower portion of said at least one bag, said first portion is an upper portion of said supporting frame and said second portion is a lower portion of said supporting frame.

15. The supporting and tilting kit according to claim 13, wherein said at least one second supporting means is mounted with said second portion of said supporting frame and comprises a stem, which extends from said second portion, said stem comprising a head, said head being of greater transverse dimensions with respect to transverse dimensions of said stem,
- that said at least one second engaging means comprises an opening, said opening comprises a first portion adapted to allow an insertion of said stem of said at least one second supporting means and a second portion of dimensions greater than said first portion and adapted to allow an insertion of said head of said at least one second supporting means,
- said at least one second supporting means being adapted to switch from an engaging configuration with said at least one second engaging means to a disengaging position from said second engaging means,
- wherein said engaging configuration of said second supporting means provides that said stem is inserted in said first portion of said opening and that said head is flush against edge walls of said first portion of said opening,
- wherein said disengaging configuration of said second supporting means provides that said stem is disengaged from said first portion of said opening and that said head can pass through said second portion of said opening.

16. The supporting and tilting kit according to claim 1, wherein said at least two portions of said supporting frame are at least two tubular elements, said first portion is a first tubular element and said second portion is a second tubular element, wherein said first tubular element is positioned along said first geometric axis and said second tubular element is positioned along said second geometric axis.

17. The supporting and tilting kit according to claim 1, wherein said supporting frame is one piece with said frame of said motorcycle.

* * * * *